July 23, 1940.  H. E. HARTIG  2,208,761

AUTOMATIC RESET MECHANISM

Filed Nov. 23, 1936

Inventor
Henry E. Hartig
By George H Fisher
Attorney

Patented July 23, 1940

2,208,761

UNITED STATES PATENT OFFICE 2,208,761

AUTOMATIC RESET MECHANISM

Henry E. Hartig, Robbinsdale, Minn., assignor to Minneapolis-Honeywell Regulator Company, Minneapolis, Minn., a corporation of Delaware Application November 23, 1936, Serial No. 112,339

8 Claims. (Cl. 236—78)

This invention relates to automatic reset or load compensation mechanism in general and more particularly to that type of mechanism as applied to a follow-up control system.

It is an object of this invention to provide a follow-up control system for controlling the value of a condition along with a novel automatic reset or load compensation mechanism for maintaining the value of the condition substantially constant regardless of changes in load.

Another object of this invention is to provide a reset mechanism utilizing a reversible induction disc motor for performing the reset function.

Other objects and advantages will become apparent to those skilled in the art upon reference to the accompanying specification, claims and drawing.

For a more thorough understanding of this invention reference is made to the accompanying single sheet of drawings, in which Figure 1 diagrammatically discloses a follow-up control system along with the reset mechanism of this invention.

Figures 1, 2, 3:
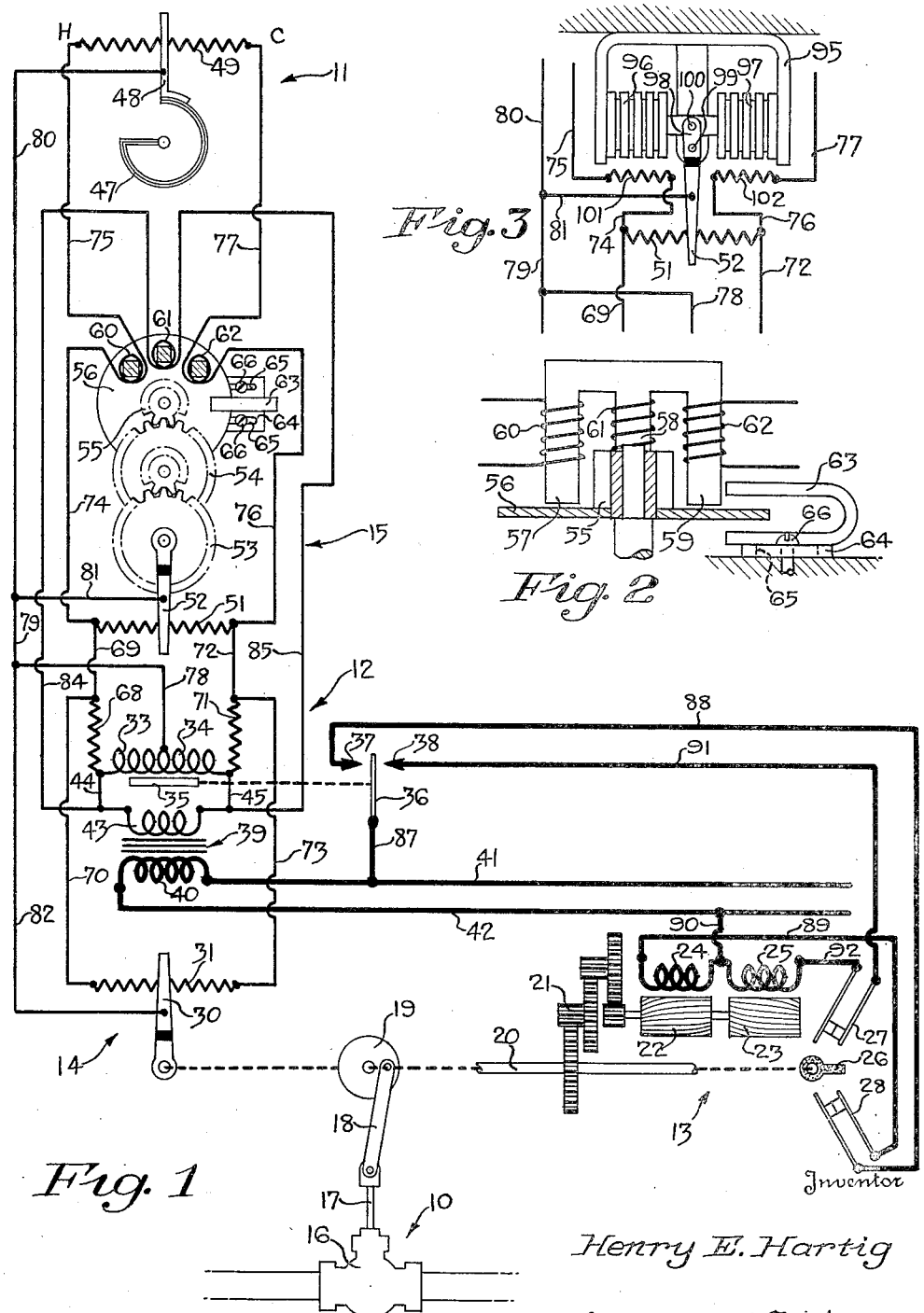
Figure 2 is a sectional view through the reset mechanism to more clearly show the relation of its parts.
Figure 3 is a modified form of reset mechanism which may be incorporated in the follow-up control system of Figure 1.

Referring now to Figure 1, a device to be positioned in a plurality of positions for controlling the value of a condition is generally designated at 10. Control means the state of which is varied in accordance with changes in the value of the condition to be controlled is generally designated at 11. The control means 11 operates a relay generally designated at 12 which in turn operates a motor generally designated at 13. The motor 13 positions the device 10 and also operates a follow-up means generally designated at 14. The follow-up means 14 also operates the relay 12 to form a follow-up control system. A reset mechanism generally designated at 15 also operates the relay 12 to position the device 10 differently with respect to the value of the condition to be controlled in order to maintain the value of the condition to be controlled at a substantially constant value irrespective of changes in load.

Although the control system of this invention may be utilized for controlling any desired condition it is shown for purposes of illustration as controlling a temperature condition and more particularly the temperature of a space, not shown. Therefore the device 10 which is positioned in a plurality of positions is shown to comprise a valve 16 for controlling the supply of heating fluid to the space. The valve 16 may be operated by a valve stem 17 which is connected by a pitman 18 to a crank disc 19 carried by a shaft 20 of the motor 13. The shaft 20 is operated through a reduction gear train by motor rotors 22 and 23. The rotors 22 and 23 are in turn operated by field windings 24 and 25 respectively, the arrangement being such that when the field winding 24 is energized the valve 16 is moved towards an open position and when field winding 25 is energized the valve 16 is moved towards a closed position.

The shaft 20 also operates an abutment member 26 preferably made of insulating material for opening limit switches 27 and 28 when the valve 16 is moved to an extreme closed position or an extreme open position respectively. The shaft 20 also operates a slider 30 with respect to a resistance element 31. The slider 30 and the resistance element 31 form a balancing potentiometer the operation of which will be pointed out more fully hereafter. When the valve 16 is moved towards a closed position the slider 30 is moved to the right and when the valve 16 is moved towards an open position the slider 30 is moved towards the left.

The relay generally designated at 12 may comprise relay coils 33 and 34 for influencing an armature 35. The armature 35 is suitably connected to a switch arm 36 which is adapted to engage spaced contacts 37 and 38. When the relay coil 33 is energized more than the relay coil 34 the switch arm 36 is moved into engagement with the contact 37. When the relay coil 34 is energized more than the relay coil 33 the switch arm 36 is moved into engagement with the contact 38. When the relay coils 33 and 34 are equally energized the switch arm 36 is maintained spaced midway between the contacts 37 and 38 as shown in Figure 1. Power is supplied to the relay 12 by means of a step down transformer 39 having a primary 40 connected across line wires 41 and 42 and a secondary 43. The left end of the secondary 43 is connected by a wire 44 to the left end of the relay coil 33 and in a like manner the right end of the secondary 43 connected by a wire 45 to the right end of the relay coil 34. The adjacent ends of the relay coils 33 and 34 are connected together. By reason of these wiring connections the relay coils 33 and 34 are connected in series and across the secondary 43.

The control means 11 is shown to be a thermostatic control means having a thermostatic element 47 responsive to variations in space temperature. Thermostatic element 47 operates a slider 48 with respect to a potentiometer resistance element 49. The slider 48 and the resistance element 49 form a control potentiometer. Upon an increase in space temperature the slider 48 is moved to the left in the direction indicated by the character H and upon a decrease in space temperature the slider 48 is moved to the right in the direction indicated by the character C. When the space temperature is at the desired normal value the slider 48 assumes a mid-position as shown in Figure 1 and this represents the normal state of the control means.

The automatic reset mechanism generally designated at 15 comprises a compensating potentiometer formed by a potentiometer resistance element 51 and a slider 52 cooperating therewith. The slider 52 is operated by a gear 53 which is connected through a gear train 54 to a pinion 55. The pinion 55 is rigidly secured to an electromagnetic induction disc 56. Cooperating with the disc 56 is a core member having three pole pieces 57, 58 and 59. Wound around the pole pieces 57, 58 and 59 are field windings 60, 61 and 62. The pole pieces 57, 58 and 59, the windings 60, 61 and 62 and the disc 56 form a reversible induction disc motor of usual design. The speed of rotation of the disc 56 for any given current flow through the windings 60, 61 and 62 may be adjusted by means of a horseshoe magnet 63. The magnet 63 is mounted upon suitable brackets 64 containing elongated slots 65. Screws 66 extend through the slot 65 and provide an adjustable mounting for the magnet 63. By loosening the screws 66 the magnet 63 may be moved inwardly or outwardly with respect to the disc 56. The magnet 63 forms a drag on the disc 56 to retard the rotation thereof. Movement of the magnet 63 inwardly permits the disc to rotate more rapidly and movement of the magnet 63 outwardly causes the disc 56 to rotate more slowly. Rotation of the disc 56 is transmitted through the gear train 54 to the gear 53 whereby the slider 52 is operated with respect to the compensating potentiometer resistance element 51.

The left end of the relay coil 33 is connected by a protective resistance 68 and wires 69 and 70 to the left ends of the compensating potentiometer resistance element 51 and the balancing potentiometer resistance element 31. In a like manner, the right end of the relay coil 34 is connected by a protective resistance 71 and wires 72 and 73 to the right ends of the compensating potentiometer resistance element 51 and the balancing potentiometer resistance element 31. The left end of the compensating potentiometer resistance element 51 is connected by a wire 74 to one end of the winding 60 and the other end of the winding 60 is connected by a wire 75 to the left end of the control potentiometer resistance element 49. The right end of the compensating potentiometer resistance element 51 is connected by a wire 76 to one end of the winding 62 and the other end of the winding 62 is connected by a wire 77 to the right end of the control potentiometer resistance element 49. The junction of the relay coils 33 and 34 is connected by wires 78, 79, 80, 81, and 82 to the slider 48 of the control potentiometer, the slider 52 of the compensating potentiometer and the slider 30 of the balancing potentiometer. From the above wiring connections it is seen that the control potentiometer, the compensating potentiometer and the balancing potentiometer are all connected in parallel with each other and in parallel with the series connected relay coils 33 and 34. All of the potentiometers and the series connected relay coils 33 and 34 are also connected across the secondary 43. The left end of the secondary 43 is connected by a wire 84 to one end of the winding 61 and the other end of the winding 61 is connected by a wire 85 to the right end of the secondary 43.

Omitting for the time being the operation of the reset mechanism including the compensating potentiometer, it is assumed that the parts are in the position shown in Figure 1. The space temperature is at the desired normal value and the valve 16 is in a mid-position for supplying just the correct amount of heat to the space to make up for the heat losses from the space. Upon an increase in the heating load the space temperature decreases and the slider 48 of the control potentiometer is moved to the right in the direction indicated by the character C. By reason of the parallel relationship pointed out above, right-hand movement of the slider 48 increases the energization of the relay coil 33 and decreases the energization of the relay coil 34. The switch arm 36 is thereupon moved into engagement with the contact 37 to complete a circuit from the line wire 41 through wire 87, switch arm 36, contact 37, wire 88, limit switch 28, wire 89, field winding 24 and wire 90 back to the other line wire 42. Completion of this circuit energizes the field winding 24 to move the valve 16 towards an open position to increase the supply of heat to the space. Operation of the motor 13 to move the valve 16 towards an open position causes left-hand movement of the slider 30 of the balancing potentiometer. This left-hand movement of the slider 30 decreases the energization of the relay coil 33 and increases the energization of the relay coil 34 and when the slider 30 has moved sufficiently far to the left to rebalance the energization of the relay coils 33 and 34, the switch arm 36 is moved out of engagement with the contact 37 to break the circuit through the field winding 24. In this manner the valve 16 is modulated towards an open position in direct accordance with the amount of decrease in space temperature.

Upon a decrease in the heating load the space temperature increases and the slider 48 of the control potentiometer is moved to the left in the direction indicated by the character H. This left-hand movement of the slider 48 decreases the energization of the relay coil 33 and increases the energization of the relay coil 34 whereupon the switch arm 36 is moved into engagement with the contact 38. Movement of the switch arm 36 into engagement with the contact 38 completes a circuit from the line wire 41 through wire 87, switch arm 36, contact 38, wire 91, limit switch 27, wire 92, field winding 25 and wire 90 back to the other line wire 42. Completion of this circuit energizes the field winding 25 to move the valve 16 towards a closed position to decrease the supply of heat to the space. Operation of the motor 13 to move the valve 16 towards a closed position causes right-hand movement of the slider 30 of the balancing potentiometer. This right-hand movement of the slider 30 decreases the energization of the relay coil 34 and increases the energization of the relay coil 33. When the slider 30 has moved sufficiently far to the right to rebalance the energization of the relay coils 33 and 34 the switch arm 36 is moved out of engagement with the contact 38 to break the circuit through field winding 25. In this manner the valve 16 is modulated towards a closed position in direct accordance with the amount of increase in space temperature.

By reason of the above construction a true follow-up control system is provided for the valve 16. It is found that if the control range of the control potentiometer is made sufficiently narrow to give an accurate temperature control "hunting" is likely to occur. It is also found that if the control range is made sufficiently wide to prevent "hunting" the space temperature "droops." In other words, the space temperature is maintained at a lower value when the heating load is relatively great than when the heating load is relatively light. In order to prevent "hunting" the control range of the control potentiometer is made sufficiently wide and in order to prevent this "drooping" characteristic of the follow-up control system the automatic reset mechanism generally designated at 15 is utilized.

In describing the operation of the follow-up control system in combination with the reset mechanism 15 it is assumed that the parts are in the position shown in Figure 1. Upon an increase in the heating load the space temperature decreases and the slider 48 is moved to the right in the direction indicated by the character C. The valve 16 is moved towards an open position and the slider 30 of the balancing potentiometer is moved to the left whereby the valve 16 is modulated towards an open position in accordance with the amount of the decrease in space temperature in the manner pointed out above. Movement of the slider 48 of the control potentiometer to the right increases the current flow through the winding 62 and decreases the current flow through the winding 60 to cause counter-clockwise rotation of the disc 56. The slider 52 of the compensating potentiometer is thereupon moved to the right with respect to the compensating potentiometer resistance element 51. Right-hand movement of the slider 52 of the compensating potentiometer decreases the energization of the relay coil 34 and increases the energization of the relay coil 33 whereupon the switch arm 36 is moved into engagement with the contact 37 to operate the motor 13 for positioning the valve 16 further towards an open position. Opening movement of the valve 16 causes left-hand movement of the slider 30 to rebalance the relay 12. As long as the slider 52 of the compensating potentiometer is moving towards the right the valve 16 will be moved towards an open position and the rate at which the valve 16 is so moved additionally towards the open position is dependent upon the rate at which the slider 52 of the compensating potentiometer moves towards the right. The slider 52 of the compensating potentiometer will continue in its right-hand movement as long as the space temperature is less than the desired normal value. When the space temperature is restored to the desired normal value by reason of this additional opening of the valve 16 the slider 48 of the control potentiometer assumes a mid-position and the current flow through the windings 60 and 62 becomes equal whereupon further right-hand movement of the slider 52 is prevented. In this manner the valve 16 is additionally positioned or reset with respect to the value of the space temperature in direct accordance with the amount of increase in the heating load.

Upon a decrease in the heating load the space temperature increases and the slider 48 moves to the left in the direction indicated by the character H. The valve 16 is modulated towards a closed position in direct accordance with the amount of increase in space temperature in the manner pointed out above. Movement of the slider 48 of the control potentiometer towards the left increases the current flow through the winding 60 and decreases the current flow through the winding 62 whereupon the disc 56 is rotated in a clockwise direction. Rotation of the disc 56 in a clockwise direction causes left-hand movement of the slider 52 with respect to the compensating potentiometer resistance element 51. Left-hand movement of the slider 52 decreases the energization of the relay coil 33 and increases the energization of the relay coil 34 to move the switch arm 36 into engagement with the contact 38. Field winding 25 is thereupon energized and the valve 16 is additionally moved towards the closed position and the slider 30 of the balancing potentiometer is moved to the right to rebalance the relay 12. As long as the space temperature is above the desired normal value slider 52 will continue in its left-hand movement to position the valve 16 further towards a closed position. The rate at which the valve 16 is additionally positioned towards the closed position is dependent upon the rate at which the slider 52 moves towards the left. As a result of this additional decrease in the supply of heat to the space the space temperature is restored to the desired normal value and the slider 48 of the control potentiometer is moved to the mid-position shown in Figure 1. When the slider 48 of the control potentiometer assumes the mid-position the current flow through the windings 60 and 62 becomes equal and further left-hand movement of the slider 52 of the compensating potentiometer is stopped. In this manner the valve 16 is additionally positioned or reset towards a closed position in accordance with the decrease in the heating load.

From the above it is seen that the valve 16 is modulated towards an open or closed position in accordance with the amount of deviation in space temperature and is additionally moved or reset towards the open or closed position in accordance with the change in heating load causing the deviation in space temperature. If the speed of rotation of the disc 56 is properly adjusted by suitably positioning the permanent magnet 63 the space temperature is maintained at a substantially constant value regardless of changes in load and "hunting" is substantially eliminated. It is seen that the amount of current flowing through the windings 60 and 62 of the induction disc motor is directly proportional to the amount of deviation in space temperature. In other words, the greater the deviation in space temperature the greater is the change of current flow through the windings 60 and 62. Therefore, the disc 56 will rotate faster in either direction as the space temperature deviates further from the desired normal value. It follows then that the rate of reset of the valve 16 is varied in accordance with the amount of deviation in space temperature. Also the rate of reset for any given deviation in space temperature may be adjusted by suitably manipulating the permanent magnet 63 which varies the drag on the induction disc 56.

Referring now to Figure 3, a modified form of reset mechanism is disclosed which may be substituted for the reset mechanism of Figure 1.

A stationary bracket 95 carries opposed thermostatic elements 96 and 97 and for purposes of illustration these thermostatic elements 96 and 97 are shown to comprise bellows which contain a volatile fluid. Mounted between the bellows 96 and 97 is a lever 98 pivoted upon a stationary pivot 99. The bellows 96 and 97 are connected together and are connected to the lever 98 by a pivot pin 100. The lever 98 operates the slider 52 of the compensating potentiometer with respect to the compensating potentiometer resistance element 51. The thermostatic elements 96 and 97 are heated by heaters 101 and 102 which are connected in the follow-up control system circuit in exactly the same manner as the windings 60 and 62 of Figure 1. When the space temperature is at the desired normal value the heaters 101 and 102 are equally energized and the slider 52 is in a mid-position. Upon a decrease in the space temperature the energization of the heater 102 is increased and the energization of the heater 101 is decreased, and the pivot 100 after a time interval is moved to the left. Movement of the pivot 100 to the left operates the slider 52 of the compensating potentiometer to the right to position the valve 16 further towards an open position in substantially the same manner as in Figure 1. Upon an increase in the space temperature the energization of the heater 101 is increased and the energization of the heater 102 is decreased. The pivot 100 is moved to the right following a time interval and the slider 52 is moved to the left for positioning additionally the valve 16 towards a closed position in a manner substantially the same as in Figure 1.

Although for purposes of illustration I have shown several forms of this invention, other forms thereof may become obvious to those skilled in the art upon reference to this specification and therefore this invention is to be limited only by the scope of the appended claims and prior art.

I claim as my invention:

1. In combination, a device to be positioned in a plurality of positions for controlling the value of a condition, adjustable control impedance means adjusted in accordance with changes in the value of the condition to be controlled, means controlled by said adjustable control impedance means for positioning said device in accordance with changes in the value of the condition to be controlled, an adjustable compensating impedance means operatively associated with said means for also positioning the device, connections electrically interconnecting said respective means, and a reversible electric motor controlled by the current flow through the connections between the control impedance means and the means that positions the device for adjusting the compensating impedance means to position said device differently with respect to the value of the condition to be controlled.

2. In combination, a device to be positioned in a plurality of positions for controlling the value of a condition, an adjustable control potentiometer adjusted in accordance with changes in the value of the condition to be controlled, means controlled by said adjustable control potentiometer for positioning said device in accordance with changes in the value of the condition to be controlled, an adjustable compensating potentiometer operatively associated with said means for also positioning the device, connections electrically interconnecting said respective means, and a reversible electric motor controlled by the current flow through the connections between the control potentiometer and the means that positions the device for adjusting the compensating potentiometer to position said device differently with respect to the value of the condition to be controlled.

3. In combination, a device to be positioned in a plurality of positions for controlling the value of a condition, adjustable control impedance means adjusted in accordance with changes in the value of the condition to be controlled, means connected to and controlled by said adjustable control impedance means for positioning said device in accordance with changes in the value of the condition to be controlled, an adjustable compensating impedance means operatively associated with said means for positioning the device, an induction disc motor operative as an incident to deviation of the condition to be controlled from the desired normal value for adjusting said compensating impedance means to position said device differently with respect to the value of the condition to be controlled, and an adjustably mounted magnet operatively associated with the disc of the induction disc motor for adjusting the speed of operation thereof to adjust the rate at which the compensating impedance means is adjusted.

4. In combination, a device to be positioned in a plurality of positions for controlling the value of a condition, adjustable control impedance means adjusted in accordance with changes in the value of the condition to be controlled, means controlled by said adjustable control impedance means for positioning said device in accordance with changes in the value of the condition to be controlled, an adjustable compensating impedance means operatively associated with said means for also positioning the device, connections electrically interconnecting said respective means, a reversible electric motor controlled by the current flow through the connections between the control impedance means and the means that positions the device for adjusting the compensating impedance means to position said device differently with respect to the value of the condition to be controlled, and means for adjusting the speed of operation of the reversible electric motor to adjust the rate at which said compensating impedance means is adjusted.

5. In combination, a device to be positioned in a plurality of positions for controlling the value of a condition, an adjustable control potentiometer adjusted in accordance with changes in the value of the condition to be controlled, means controlled by said adjustable control potentiometer for positioning said device in accordance with changes in the value of the condition to be controlled, an adjustable compensating potentiometer operatively associated with said means for also positioning the device, connections electrically interconnecting said means and said control and compensating potentiometers, a reversible electric motor controlled by the current flow through the connections between the control potentiometer and the means that positions the device for adjusting the compensating potentiometer to position said device differently with respect to the value of the condition to be controlled, and means for adjusting the speed of operation of the reversible electric motor to adjust the rate at which said compensating potentiometer is adjusted.

6. In combination, a device to be positioned in a plurality of positions for controlling the value of a condition, adjustable control impedance means adjusted in accordance with changes in value of the condition to be controlled, adjustable balancing impedance means adjusted by said device, means for positioning said device, connections between said control impedance means, said balancing impedance means and said means to position said device in accordance with changes in the value of the condition to be controlled, adjustable compensating impedance means, connections between said compensating impedance means and said means, and an induction disc motor controlled by the current flow through the first mentioned connections for adjusting the compensating impedance means to position said device differently with respect to the value of the condition to be controlled.

7. In combination, a device to be positioned in a plurality of positions for controlling the value of a condition, adjustable control impedance means adjusted in accordance with changes in value of the condition to be controlled, adjustable balancing impedance means adjusted by said device, means for positioning said device, connections between said control impedance means, said balancing impedance means and said means to position said device in accordance with changes in the value of the condition to be controlled, adjustable compensating impedance means connected to said means, an induction disc motor controlled by the current flow through the first mentioned connections for adjusting the compensating impedance means to position said device differently with respect to the value of the condition to be controlled, and means for adjusting the speed of operation of said induction disc motor.

8. In combination, a device to be positioned in a plurality of positions for controlling the value of a condition, an adjustable control potentiometer adjusted in accordance with changes in value of the condition to be controlled, an adjustable balancing potentiometer adjusted by said device, means for positioning said device, connections between said control potentiometer, said balancing potentiometer and said means to position said device in accordance with changes in the value of the condition to be controlled, an adjustable compensating potentiometer, connections between said compensating potentiometer and said means, and an induction disc motor controlled by the current flow through the first mentioned connections for adjusting the compensating potentiometer to position said device differently with respect to the value of the condition to be controlled.

HENRY E. HARTIG.